(12) United States Patent
Wuidart (10) Patent No.: US 8,922,338 B2
(45) Date of Patent: Dec. 30, 2014

(54) POWER MANAGEMENT IN AN ELECTROMAGNETIC TRANSPONDER

(75) Inventor: Luc Wuidart, Pourrieres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 958 days.

(21) Appl. No.: 12/815,776

(22) Filed: Jun. 15, 2010

(65) Prior Publication Data

US 2011/0140852 A1    Jun. 16, 2011

(30) Foreign Application Priority Data

Jun. 19, 2009   (FR) ...................................... 09 54149

(51) Int. Cl.
*G05B 19/00*       (2006.01)
*H04Q 1/30*        (2006.01)
*G06K 19/07*       (2006.01)

(52) U.S. Cl.
CPC ........ *G06K 19/0723* (2013.01); *G06K 19/0715* (2013.01); *G06K 19/0707* (2013.01); *G06K 19/0712* (2013.01)
USPC .......................... 340/5.61; 340/10.1; 340/10.5

(58) Field of Classification Search
USPC ............... 340/10.1, 10.4, 118, 572.1, 825.49; 342/118
See application file for complete search history.

(56) References Cited

U.S. PATENT DOCUMENTS

| | | | |
|---|---|---|---|
| 4,207,468 A * | 6/1980 | Wilson ........................ | 250/341.1 |
| 5,703,573 A | 12/1997 | Fujimoto et al. | |
| 5,850,181 A * | 12/1998 | Heinrich et al. ........... | 340/572.1 |
| 5,905,372 A * | 5/1999 | Kuffner et al. ................ | 323/356 |
| 6,282,407 B1 * | 8/2001 | Vega et al. .................... | 455/41.1 |
| 6,362,738 B1 * | 3/2002 | Vega ........................... | 340/572.1 |
| 6,473,028 B1 * | 10/2002 | Luc ............................... | 342/118 |
| 6,650,229 B1 | 11/2003 | Wuidart et al. | |
| 6,703,921 B1 * | 3/2004 | Wuidart et al. .............. | 340/10.4 |
| 6,724,103 B2 * | 4/2004 | Parrault ........................ | 307/104 |
| 6,889,905 B2 | 5/2005 | Shigemasa et al. | |
| 6,960,985 B2 | 11/2005 | Wuidart | |
| 7,049,935 B1 | 5/2006 | Wuidart et al. | |
| 7,049,936 B2 * | 5/2006 | Wuidart ........................ | 340/10.4 |
| 7,263,330 B2 * | 8/2007 | Wuidart ........................ | 455/41.1 |
| 7,671,748 B2 * | 3/2010 | Grasset ....................... | 340/572.7 |
| 8,446,259 B2 * | 5/2013 | Wuidart ........................ | 340/10.4 |
| 2003/0071717 A1 | 4/2003 | Hagl et al. | |

(Continued)

FOREIGN PATENT DOCUMENTS

| | | |
|---|---|---|
| EP | 0857981 | 8/1998 |
| EP | 1071038 A1 | 1/2001 |

(Continued)

OTHER PUBLICATIONS

French Search Report dated Feb. 8, 2010 from corresponding French Application No. 09/54149.

(Continued)

*Primary Examiner* — Hai Phan
*Assistant Examiner* — Royit Yu
(74) *Attorney, Agent, or Firm* — Seed IP Law Group PLLC (57) ABSTRACT

A method of evaluation, by an electromagnetic transponder in the field of a terminal generating a magnetic field, of power that can be extracted from this field, including the steps of: evaluating the current coupling between the transponder and the terminal; and deducing therefrom information relative to the power available in this coupling position.

35 Claims, 6 Drawing Sheets

(56) References Cited

U.S. PATENT DOCUMENTS

| | | | |
|---|---|---|---|
| 2003/0098783 A1* | 5/2003 | Pagnol | 340/10.1 |
| 2005/0001609 A1 | 1/2005 | Cuylen | |
| 2005/0046568 A1* | 3/2005 | Tanaka | 340/539.13 |
| 2005/0231328 A1 | 10/2005 | Castle et al. | |
| 2007/0182660 A1* | 8/2007 | Wu et al. | 343/876 |
| 2008/0100422 A1* | 5/2008 | Tuttle et al. | 340/10.1 |
| 2008/0136643 A1 | 6/2008 | Yeo et al. | |
| 2008/0150814 A1* | 6/2008 | Hedou et al. | 343/703 |
| 2008/0180224 A1* | 7/2008 | Klapf et al. | 340/10.4 |
| 2008/0186180 A1* | 8/2008 | Butler et al. | 340/572.1 |
| 2008/0204206 A1* | 8/2008 | Frohler | 340/426.1 |
| 2008/0238625 A1* | 10/2008 | Rofougaran et al. | 340/10.1 |
| 2009/0051499 A1* | 2/2009 | Nakao | 340/10.34 |
| 2009/0096580 A1* | 4/2009 | Paananen | 340/10.1 |
| 2009/0146819 A1* | 6/2009 | Mani | 340/572.7 |
| 2009/0207000 A1* | 8/2009 | Mickle et al. | 340/10.34 |
| 2010/0026459 A1* | 2/2010 | Seppa | 340/10.1 |
| 2012/0056718 A1* | 3/2012 | Leutgeb et al. | 340/10.1 |

FOREIGN PATENT DOCUMENTS

| | | |
|---|---|---|
| FR | 2757952 A1 | 7/1998 |
| JP | H11-338983 A | 12/1999 |
| JP | 2006-119693 A | 5/2006 |

OTHER PUBLICATIONS

French Search Report dated Feb. 9, 2010 from related French Application No. 09/54148.

French Search Report dated Feb. 9, 2010 from related French Application No. 09/54147.

French Search Report dated Feb. 3, 2010 from related French Application No. 09/54347.

French Search Report dated Feb. 2, 2010 from related French Application No. 09/54345.

French Search Report dated Feb. 17, 2010 from related French Application No. 09/54351.

Japanese office action dated Mar. 11, 2014 from corresponding Japanese Application No. 2010-139734. A translation of portions of the office action is provided.

* cited by examiner

POWER MANAGEMENT IN AN ELECTROMAGNETIC TRANSPONDER

CROSS REFERENCE TO RELATED APPLICATIONS

This application claims the priority benefit of French patent application Ser. No. 09/54149, filed on Jun. 19, 2009, entitled "POWER MANAGEMENT IN AN ELECTROMAGNETIC TRANSPONDER," which is hereby incorporated by reference to the maximum extent allowable by law.

BACKGROUND OF THE INVENTION

1. Field of the Invention

The present invention generally relates to electronic systems, and more specifically to systems using electromagnetic transponders, that is, transceivers capable of being interrogated in a contactless and wireless manner by a read and/or write terminal.

2. Discussion of the Related Art

Many communication systems are based on a modulation of an electromagnetic field generated by a terminal. They range from the simplest electronic tag used as a theft-prevention device to more complex systems where a transponder intended to communicate with the terminal having it in its field, is equipped with calculation functions (electronic purse, for example) or data processing functions.

Electromagnetic transponder systems are based on the use of oscillating circuits comprising a winding forming an antenna, on the transponder side and on the terminal side. Such circuits are intended to be coupled by a near magnetic field when the transponder enters the field of the terminal. The oscillating circuits of the terminal and of the transponder are generally tuned to the same frequency corresponding to the excitation frequency of the oscillating circuit of the terminal.

In most cases, transponders have no autonomous power supply and extract the power supply necessary to their circuits from the high-frequency field radiated by the antenna of the terminal.

The present invention more specifically applies to transponders equipped with a processing unit capable of performing calculations, for example, on request of a terminal having the transponder in its field. This type of transponder is especially involved as soon as cryptographic calculations need to be implemented, for example, to authenticate or cipher a transmission. Now, in a given position with respect to a terminal, a transponder cannot currently evaluate the maximum current that its circuits can consume.

When a transponder has to perform calculations, it would be desirable to know in advance whether the voltage that it recovers from the field radiated by the terminal enables it to perform these calculations. It would in particular be desirable for a transponder not to start a cryptographic calculation that it cannot complete. This may also be used to manage priorities between processings according to the available power.

The power transfer between the terminal and the transponder depends on the coupling between the terminal and the transponder. This coupling, which is inversely proportional (non-linear) to the distance between the terminal and the transponder, conditions the amplitude of the voltage recovered by the transponder.

When a transponder is dedicated to a type of terminals, it can be envisaged to size the circuits to optimize the coupling. It can further be envisaged to determine, for a given calculation, the amount of power needed by the transponder, and thus the voltage that it needs to recover to obtain this power.

However, transponder systems generally provide for a given transponder to be usable in cooperation with a large number of terminals which have different features.

SUMMARY OF THE INVENTION

It would be desirable to be able to evaluate the ability of a transponder to perform processings according to the power that it captures from the field radiated by the terminal.

It would also be desirable to be able to evaluate the variation of this available power during a communication.

It would also be desirable to inform the terminal of the type of request that it can send to the transponder to be executed.

It would also be desirable to be able to evaluate this available power without it being necessary to perform a data exchange between the terminal and the transponder.

It would also be desirable to provide a solution independent from the type of terminal having the transponder in its field.

To achieve all or part of these objects as well as others, at least one embodiment of the present invention provides a method of evaluation, by an electromagnetic transponder in the field of a terminal generating a magnetic field, of the power that it can extract from this field, comprising the steps of:

evaluating the current coupling between the transponder and the terminal; and deducing therefrom data relative to the power available in this coupling position.

According to an embodiment of the present invention:

the transponder comprises an oscillating circuit upstream of rectifying means capable of providing a D.C. voltage;

first data relative to the level of said D.C. voltage are measured and stored for a first value of the resistive load formed by circuits of the transponder on the oscillating circuit;

second data relative to the level of said D.C. voltage are measured and stored for a second value of the resistive load on the oscillating circuit; and a position of the current coupling factor with respect to an optimum coupling position with one of the two values of the resistive load is deduced therefrom.

According to an embodiment of the present invention, said data relative to the available power are the maximum current that can be sampled from the transponder circuits under a minimum voltage.

According to an embodiment of the present invention, a variation of the resistive load between the first and second values is obtained by switching a resistive retromodulation element comprised by the transponder.

At least one embodiment of the present invention also provides a method for managing the power of an electromagnetic transponder in the field of a terminal, wherein:

the available power is estimated; and it is compared with the power required for the execution of a function by the transponder.

According to an embodiment of the present invention, power required for different functions are stored in the transponder.

According to an embodiment of the present invention, the execution of the function is only started by the transponder if the available power is sufficient.

According to an embodiment of the present invention, the functions executed by the transponder are adapted according to the available power.

According to an embodiment of the present invention, data relative to the required power are transmitted to the terminal to have it adapt the power of the generated field.

The present invention also provides an electromagnetic transponder comprising:

an oscillating circuit upstream of a rectifying circuit capable of providing a D.C. voltage when the transponder is present in the magnetic field of a terminal; and at least one processing unit.

According to an embodiment of the present invention, the transponder further comprises at least one switchable resistive element capable of being functionally connected in parallel on the oscillating circuit.

The foregoing objects, features, and advantages of the present invention will be discussed in detail in the following non-limiting description of specific embodiments in connection with the accompanying drawings.

DETAILED DESCRIPTION

The same elements have been designated with the same reference numerals in the different drawings. For clarity, only those steps and elements which are useful to the understanding of the present invention have been shown and will be described. In particular, the communications between the transponder and the terminal have not been detailed, the present invention being compatible with any usual communication. Further, the tasks executable by a transponder, other than the determination of the available power, have not been detailed either, the present invention being here again compatible with any usual function of a terminal or of a transponder.

Figure 1:
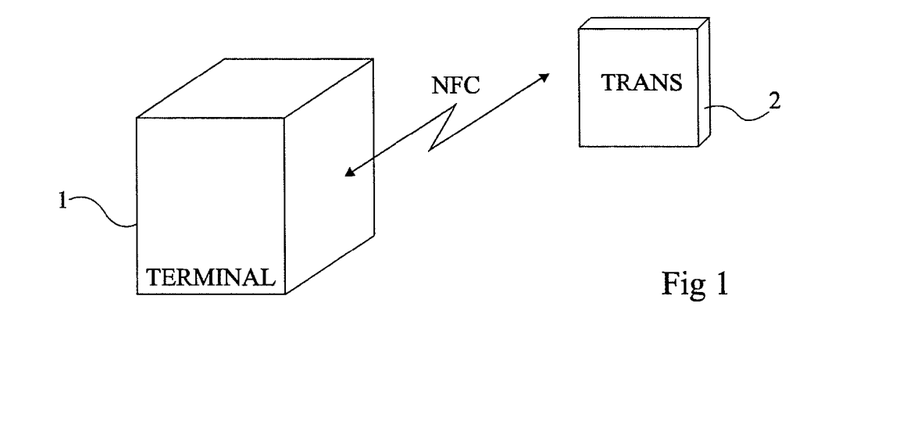
FIG. 1 is a very simplified representation of a transponder system of the type to which the present invention applies as an example.

FIG. 1 is a block diagram of an electromagnetic transponder communication system. A terminal 1 (TERMINAL) capable of communicating in near field (for example according to a near field communication protocol NFC) with a distant element, that is, a transponder (TRANS).

The terminal may take different forms, for example, a transport ticket validation terminal, an electronic passport reader, a laptop computer, a mobile telecommunication device (GSM phone, PDA, etc.), an electronic control unit for starting an automobile vehicle, etc.

The transponder may similarly take different forms, for example, a chip card, an electronic transport ticket, an electronic passport, a telecommunication terminal (GSM phone, PDA, etc.), an electronic tag, etc.

Figure 2:
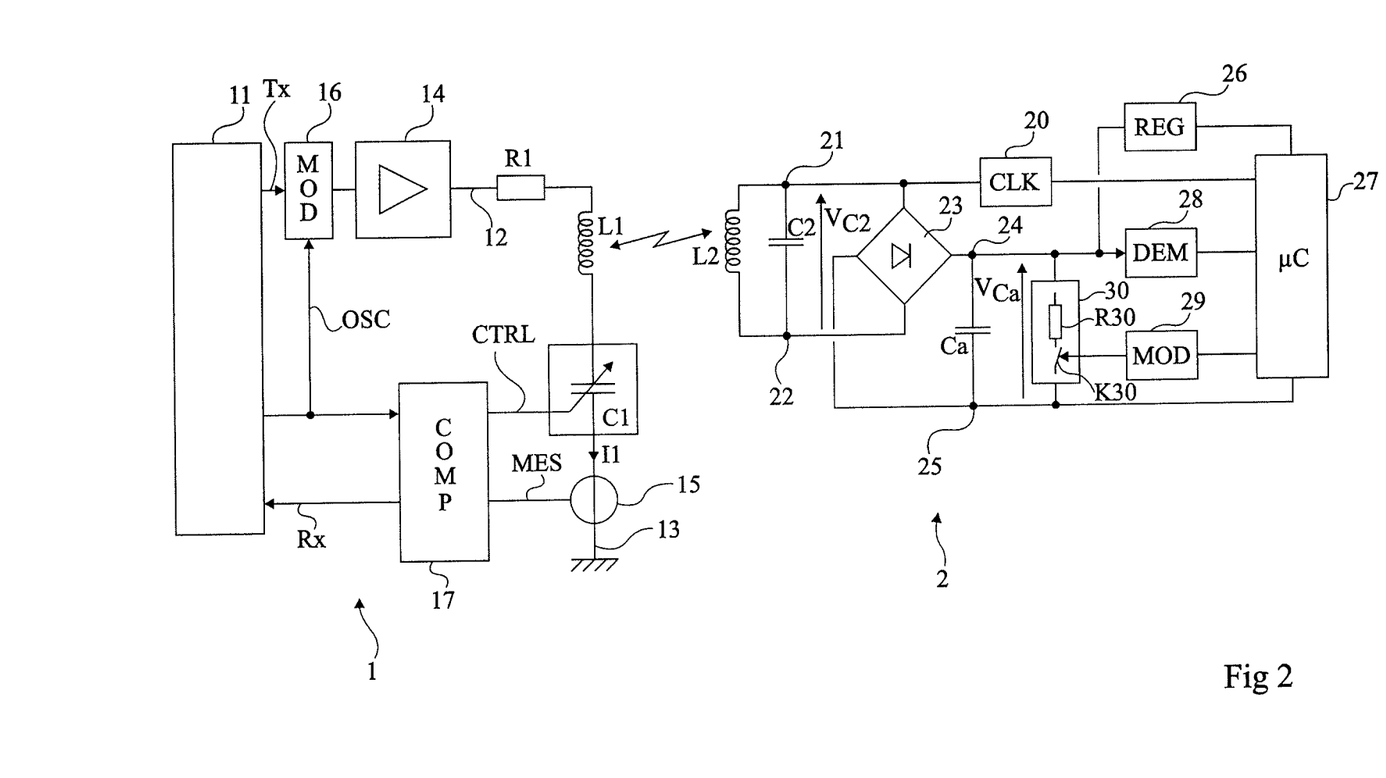
FIG. 2 is a simplified block diagram of a terminal and of a transponder of an electromagnetic transponder communication system.

FIG. 2 very schematically shows an example of a terminal 1 and of a transponder 2.

Terminal 1 comprises an oscillating circuit, generally series, formed of an inductance L1 in series with a capacitor C1 and a resistor R1. This series oscillating circuit is, in the example of FIG. 2, connected between an output terminal 12 of an amplifier or antenna coupler 14 and a terminal 13 at a to reference voltage (generally the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal originating from a modulator 16 (MOD) which receives a reference frequency (signal OSC), for example, from a quartz oscillator (not shown). Modulator 16 receives, if need be, a signal Tx originating from a circuit 11 for controlling and exploiting the transmissions. Circuit 11 is generally provided with a control and data processing microprocessor, communicating with different input/output circuits (keyboard, display, element of exchange with a server, etc.) and/or processing circuits, not shown. The elements of terminal 1 most often draw the power necessary to their operation from a supply circuit (not shown) connected, for example, to the power line distribution system (mains) or to a battery (for example, that of an automobile vehicle or of a portable telephone or computer). Modulator 16 provides a high-frequency carrier (for example, at 13.56 MHz) to series oscillating circuit L1-C1 which generates a magnetic field.

Capacitive element C1 is, for example, a variable-capacitance element controllable by a signal CTRL. This element takes part in the phase regulation of current I1 in antenna L1 with respect to a reference signal. This regulation is a regulation of the high-frequency signal, that is, of the signal of the carrier corresponding to the signal provided to amplifier 14 in the absence of data Tx to be transmitted. The regulation is performed by varying capacitance C1 of the oscillating circuit of the terminal to maintain the current in the antenna in constant phase relationship with a reference signal. This reference signal for example corresponds to signal OSC provided to modulator 14. Signal CTRL originates from a circuit 17 (COMP) having the function of detecting the phase interval with respect to the reference signal and of accordingly modifying the capacitance of element C1. The comparator receives data MES about current I1 in the oscillating circuit detected by measurement element 15 (for example, a current transformer or a resistor).

A transponder 2, capable of cooperating with terminal 1, comprises an oscillating circuit, for example, parallel, formed of an inductance L2 in parallel with a capacitor C2 between two terminals 21 and 22. The parallel oscillating circuit (called receive mode resonant circuit) is intended to capture the magnetic field generated by oscillating circuit L1-C1 of terminal 1. Circuits L2-C2 and L1-C1 are tuned to a same resonance frequency (for example, 13.56 MHz). Terminals 21 and 22 are connected to two A.C. input terminals of a rectifying bridge 23 (most often, fullwave). The rectified output terminals of bridge 23 respectively define a positive terminal 24 and a reference terminal 25. A capacitor Ca is connected between terminals 24 and 25 to smooth the rectified voltage.

When transponder 2 is in the field of terminal 1, a high-frequency voltage is generated across resonant circuit L2-C2. This voltage, rectified by bridge 23 and smoothed by capacitor Ca, provides a supply voltage to electronic circuits of the transponder via a voltage regulator 26 (REG). Such circuits generally comprise a processing unit 27 (for example, a microcontroller μC) associated with a memory (not shown), a demodulator 28 (DEM) of the signals that may have been received from terminal 1, and a modulator 29 (MOD) for transmitting data to the terminal. The transponder is generally synchronized by means of a clock (CLK) extracted, by a block 20, from the high-frequency signal recovered, before rectification, from one of terminals 21 and 22. Most often, all the electronic circuits of transponder 2 are integrated in the same chip.

To transmit data from terminal 1 to the transponder, circuit 16 modulates (generally in amplitude) the carrier (signal OSC) according to signal Tx. On the side of transponder 2, these data are demodulated by demodulator 28 based on voltage $V_{Ca}$. The demodulator may sample the signal to be demodulated upstream of the rectifying bridge.

To transmit data from transponder 2 to terminal 1, modulator 29 controls a stage of modulation 30 (retromodulation) of the load formed by the transponder circuits on the magnetic field generated by the terminal. This stage is generally formed of an electronic switch K30 (for example, a transistor) and of a resistor R30 (or a capacitor), in series between terminals 24 and 25. Switch K30 is controlled at a so-called sub-carrier frequency (for example, 847.5 kHz), much lower (generally with a ratio of at least 10) than the frequency of the excitation signal of the oscillating circuit of terminal 1. When switch K30 is on, the oscillating circuit of the transponder is submitted to an additional damping with respect to the load formed by circuits 20, 26, 27, 28, and 29 so that the transponder samples a greater amount of power from the high-frequency magnetic field. On the side of terminal 1, amplifier 14 maintains the amplitude of the high-frequency excitation signal constant. Accordingly, the power variation of the transponder translates as an amplitude and phase variation of the current in antenna L1. This variation is detected by an amplitude or phase demodulator of the terminal. In the embodiment illustrated in FIG. 2, comparator 17 integrates a phase demodulator also used to demodulate the signal originating from the transponder. Accordingly, comparator 17 provides a signal Rx giving back to circuit 11 a possible retromodulation of data received from a transponder. Other demodulation circuits may be provided, for example, a circuit exploiting a measurement of the voltage across capacitor C1.

Many variations exist to encode/decode and modulate/demodulate communications between a transponder and a terminal.

The response time of the phase regulation loop is sufficiently long to avoid disturbing the possible retromodulation from a transponder and sufficiently short as compared with the speed at which a transponder passes in the field of the terminal. One can speak of a static regulation with respect to the modulation frequencies (for example, the 13.56-MHz frequency of the remote supply carrier and the 847.5-kHz retromodulation frequency used to transmit data from the transponder to the terminal).

An example of a phase regulation terminal is described in document EP-A-0857981.

Regulating the phase on the terminal side enables using current and voltage measurements in the oscillating circuit of the transponder to deduce from these measurements information relative to the transponder coupling when it is in the field of the terminal. The coupling coefficient between the oscillating circuit of the terminal and of the transponder essentially depends on the distance separating the transponder from the terminal. The coupling coefficient, noted k, is always between 0 and 1. It can be defined by the following formula:

$$k = \frac{M}{\sqrt{L1 \cdot L2}}, \quad \text{(formula 1)}$$

where M represents the mutual inductance between inductances L1 and L2 of the oscillating circuits of the terminal and of the transponder.

An optimum coupling is defined as being the position at which voltage $V_{C2}$ across the oscillating circuit of the transponder is maximum. This optimum coupling, noted $k_{opt}$, may be expressed as:

$$k_{opt} = \sqrt{\frac{L2}{L1} \cdot \frac{R1}{R2}}, \quad \text{(formula 2)}$$

where R2 represents the resistance equivalent to the load formed by the elements of the transponder on its own oscillating circuit. In other words, resistance R2 represents the equivalent resistance of all the circuits of transponder 2, placed in parallel on capacitor C2 and inductance L2 (before or after the rectifying bridge). The conductance due to the transponder circuits, and thus their power consumption, is called "resistive load". The level of this load is symbolized by resistor R2 in parallel across the oscillating circuit. In above formula 2, the series resistance of inductance L1 (terminal antenna) has been neglected. It can also be considered that the value of this series resistance is, for simplification, included in the value of resistor R1.

Figure 3:
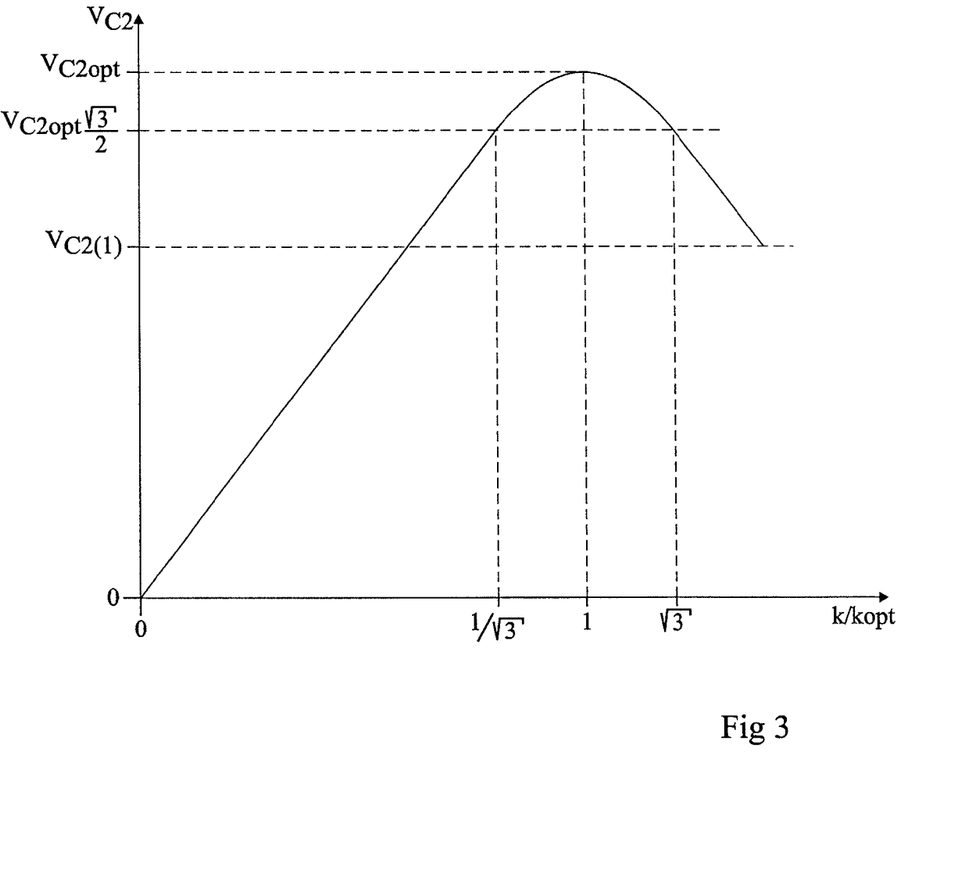
FIG. 3 illustrates an example of the variation of the voltage across the oscillating circuit of the transponder according to the coupling factor.

FIG. 3 shows an example of the shape of voltage $V_{C2}$ recovered on the transponder side according to the coupling $k/k_{opt}$ normalized with respect to the optimum coupling. The curve starts from the origin of ordinates (zero voltage) for a zero coupling. This corresponds to a distance from the transponder to the terminal such that no signal is sensed by the transponder. Voltage $V_{C2}$ reaches a maximum value $V_{C2opt}$ for optimum coupling coefficient $k_{opt}$ ($k/k_{opt}=1$), then decreases to an intermediary value $V_{C2}(1)$ reached at coupling k=1.

As illustrated in FIG. 3, voltage $V_{C2}$ transits through two points of inflexion for coupling values corresponding to ratios $k/k_{opt}=1/\sqrt{3}$ and $k/k_{opt}=\sqrt{3}$, for which voltage $V_{C2}$ takes value $$V_{C2opt} \cdot \frac{\sqrt{3}}{2}.$$

Voltage $V_{C2}$ recovered on the side of the transponder conditions the power available for its processing circuits, and thus the power available for these circuits. It is thus provided to exploit this information.

It could have been envisaged to store, on the transponder side, a table of correlation (for example, obtained by training) between voltage $V_{C2}$ and the processings that may be performed according to the power consumption that they generate. However, such a table would only be valid for a couple of values of resistor R1 and inductance L1, on the terminal side, and thus dedicated to a family of terminals. To store, by training, tables for all the encountered terminals is in practice impossible to envisage for memory space reasons.

To evaluate, on the transponder side, the coupling of this transponder with the terminal, the information of voltage $V_{C2}$ across capacitive element C2 of its oscillating circuit is exploited. This voltage is provided by the following relation:

$$V_{C2} = \frac{I2}{\omega \cdot C_2}, \qquad \text{(formula 3)}$$

where I2 represents the current in the oscillating circuit of the transponder, and where ω represents the pulse of the signal.

Current I2 is equal to:

$$I2 = \frac{M \cdot \omega \cdot I1}{Z2}, \qquad \text{(formula 4)}$$

where I1 represents the current in the oscillating circuit of the terminal and where Z2 represents the transponder impedance.

Impedance Z2 of the transponder is provided by the following relation:

$$Z2^2 = X2^2 + \left(\frac{L2}{R2 \cdot C2}\right)^2, \qquad \text{(formula 5)}$$

where X2 represents the imaginary part of the impedance of the oscillating circuit $$\left(X2 = \omega \cdot L2 - \frac{1}{\omega \cdot C2}\right).$$

Further, current I1 in the oscillating circuit of the terminal is given by the following relation:

$$I1 = \frac{Vg}{Z1_{app}}, \qquad \text{(formula 6)}$$

where Vg designates a so-called generator voltage, exciting the oscillating circuit of the terminal, and where $Z1_{app}$ represents the apparent impedance of the oscillating circuit.

Regulating the phase of the oscillating circuit of the terminal allows for all the variations which would tend to modify, statically with respect to the modulation frequencies, the imaginary part of the load formed by the transponder, to be compensated by the phase regulation loop. It is thus ensured that in static operation, the imaginary part of impedance $Z1_{app}$ is zero. Accordingly, impedance $Z1_{app}$ becomes equal to apparent resistance $R1_{app}$ (real part of the impedance) and may be expressed as:

$$Z1_{app} = R1_{app} = R1 + \frac{k^2 \cdot \omega^2 \cdot L1 \cdot L2^2}{Z2^2 \cdot R2 \cdot C2}. \qquad \text{(formula 7)}$$

Since the oscillating circuits are tuned, it can be considered that imaginary part X2 of impedance Z2 is, as a first approximation, close to zero. As a result, the value of impedance Z2 can be written as:

$$Z2 = \frac{L2}{R2 \cdot C2}. \qquad \text{(formula 8)}$$

By inserting this simplification into formulas 4 and 7, and inserting formula 4 into formula 3, the following formula can be obtained for voltage $V_{C2}$ recovered across the oscillating circuit of the transponder:

$$V_{C2} = k \cdot \sqrt{\frac{L1}{L2}} \cdot \frac{V_g}{\frac{R1}{R2} + k^2 \cdot \frac{L1}{L2}}. \qquad \text{(formula 9)}$$

It should be noted that formula 9 is only applicable when the oscillating circuit of transponder L2-C2 is considered to be set to the tuning frequency, that is, $\omega \cdot \sqrt{L2 \cdot C2} = 1$.

In optimum coupling position $k_{opt}$, maximum voltage $V_{C2opt}$ is thus provided by the following formula (combining formulas 2 and 9):

$$V_{C2opt} = \frac{Vg}{2} \cdot \sqrt{\frac{R2}{R1}} \qquad \text{(formula 10)}$$

Formula 9 shows that, for a given terminal (fixed values of R1 and L1) and for a fixed inductance L2 (and thus a fixed value of C2), the voltage only depends on coupling k and on the resistive load formed by the transponder circuits and brought in parallel on the oscillating circuit.

Figure 4:
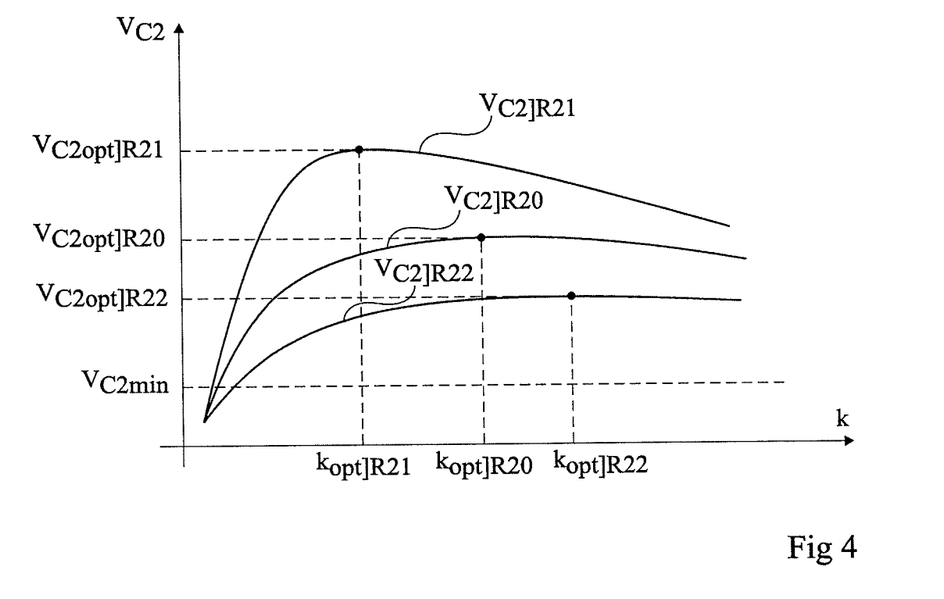
FIG. 4 illustrates examples of the variation of the voltage across the oscillating circuit of the transponder according to the coupling factor.

FIG. 4 shows an example of the shape of voltage $V_{C2}$ according to coupling coefficient k for several values of resistance R2. Increasing values R22, R20, and R21 are assumed. The larger the value R22, R20, R21 of resistor R2, the larger the value $V_{C2|R22}$, $V_{C2|R20}$, $V_{C2|R21}$ of voltage $V_{C2}$ for a same given coupling k. Further, the more the value of resistor R2 increases, the lower the value of coupling k which is needed to obtain optimum coupling $k_{opt|R22}$, $k_{opt|R20}$, $k_{opt|R21}$.

There is a minimum value $V_{C2min}$ of voltage $V_{C2}$ below which the power supply is insufficient. This level can be considered as the maximum power consumption level (resistive load value) that can be envisaged for a given coupling position. Decreasing resistance R2 to obtain level $V_{C2min}$ indirectly provides, for a given position (coupling k) of the transponder with respect to the terminal, the maximum current that the transponder circuits can consume.

Noting Vcc the regulated supply voltage provided to the transponder circuits (especially to the microcontroller), this voltage can be expressed as:

$$Vcc = R2min.Ic_{max} = R20.Ic_{|R20}, \qquad \text{(formula 11)}$$

where $Ic_{max}$ and $Ic_{|R20}$ designate the values of current Ic provided by regulator 26, for an equivalent resistance R2 which is respectively minimum (value R2 min) and of value R20.

Noting ΔV the voltage drop upstream of regulator 26, minimum value $V_{C2min}$ of voltage $V_{C2}$ can be expressed as:

$$V_{C2min} = Vcc + \Delta V. \qquad \text{(formula 12)}$$

The sole information of current voltage $V_{C2}$ is not sufficient to evaluate the coupling. Indeed, FIG. 3 shows that a same value of voltage $V_{C2}$ may correspond to two coupling values. Accordingly, it is provided to evaluate the current coupling against the optimum coupling.

By combining formulas 9 and 10 and by expressing the coupling as normalized by the optimum coupling ($k/k_{opt}$), the following expression of voltage $V_{C2}$ is obtained:

$$V_{C2} = 2 \cdot V_{C2opt} \cdot \frac{\frac{k}{k_{opt}}}{1 + \left(\frac{k}{k_{opt}}\right)^2} \quad \text{(formula 13)}$$

For a given coupling value k, considering that the impedance of the oscillating circuit of the terminal does not vary and that the circuits remain tuned, the ratio between current coefficients k and optimum coefficients $k_{opt]R20}$ and $k_{opt]R22}$, respectively for a resistor R2 of value R20 and of value R22 provides, according to formula 2, the following expression:

$$\frac{\frac{k}{k_{opt]R20}}}{\frac{k}{k_{opt]R22}}} = \sqrt{\frac{R20}{R22}} \quad \text{(formula 14)}$$

Still in the same conditions, the ratio between values $V_{C2]R22}$ and $V_{C2]R20}$ of voltage $V_{C2}$, respectively for values R22 and R20 of resistor R2, provides the following relation:

$$\frac{V_{C2]R22}}{V_{C2]R20}} = \frac{\left(\frac{k}{k_{opt]R20}}\right)^2 + 1}{\left(\frac{k}{k_{opt]R20}}\right)^2 + \frac{R20}{R22}}. \quad \text{(formula 15)}$$

Formula 15 may also be written as (with R22 smaller than R20):

$$\left(\frac{k}{k_{opt]R20}}\right)^2 = \frac{\frac{V_{C2]R22}}{V_{C2]R20}} \cdot \frac{R20}{R22} - 1}{1 - \frac{V_{C2]R22}}{V_{C2]R20}}}. \quad \text{(formula 16)}$$

For a value R21 greater than R20, formula 16 provides:

$$\left(\frac{k}{k_{opt]R20}}\right)^2 = \frac{1 - \frac{V_{C2]R21}}{V_{C2]R20}} \cdot \frac{R20}{R21}}{\frac{V_{C2]R21}}{V_{C2]R20}} - 1}. \quad \text{(formula 16')}$$

Further, as applied to values R20 and R2 min, formula 15 provides the following formula 17:

$$\frac{R20}{R2\min} = \frac{V_{C2]R20}}{V_{C2\min}} \cdot \left[\left(\frac{k}{k_{opt]R20}}\right)^2 + 1\right] - \left(\frac{k}{k_{opt]R20}}\right)^2.$$

By combining formulas 11, 12, and 17, maximum current $Ic_{max}$ can be expressed according to the following formula 18:

$$Ic_{max} = Ic_{]R20} \cdot \left(\frac{V_{C2]R20}}{(Vcc + \Delta V)} \cdot \left[\left(\frac{k}{k_{opt]R20}}\right)^2 + 1\right] - \left(\frac{k}{k_{opt]R20}}\right)^2\right).$$

It is provided, for a given coupling (with a value R20 of resistor R2), to evaluate the maximum consumption (current $Ic_{max}$) that can be envisaged according to formula 18.

Formula 16' shows that by increasing the value of resistance R2, from a first value R20 to a second greater value R21 (which amounts to decreasing the current sampled by the transponder circuits from oscillating circuit L2-C2), ratio $k/k_{opt]R20}$ can be determined (determining the square of this ratio is sufficient to apply formula 18).

In practice, the smoothed voltage across capacitor $V_{Ca}$ at the output of rectifying bridge 23 is measured rather than the voltage across the oscillating circuit. Voltage $V_{Ca}$ is proportional to voltage $V_{C2}$. Since voltage ratios are evaluated, it is not necessary to know the proportionality factor between voltages $V_{C2}$ and $V_{Ca}$. In a specific embodiment, the measurement is performed by the microprocessor. The storage of the values of the measured voltages is performed either by analog means or, preferentially, digitally over several bits in a number depending on the desired accuracy of analysis.

Figure 5:
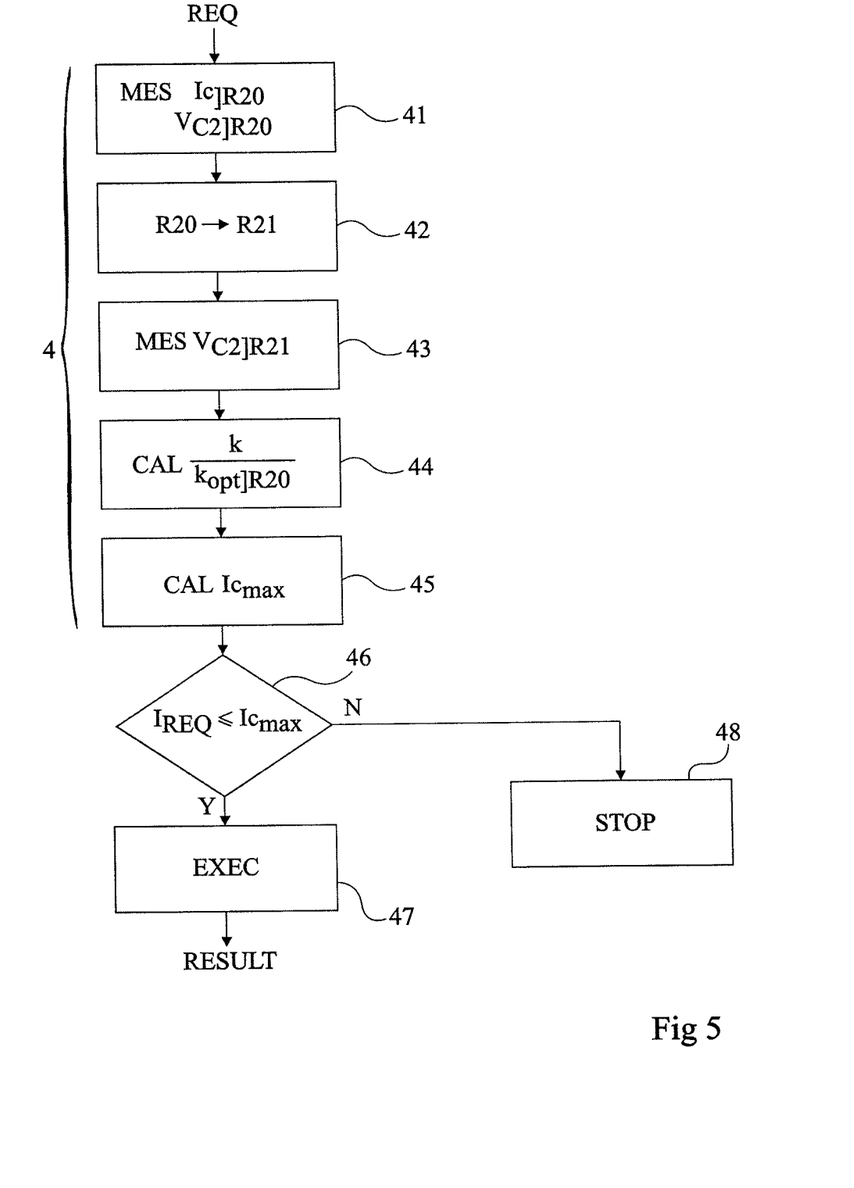
FIG. 5 is a functional block diagram illustrating an embodiment of the evaluation and power management method.

FIG. 5 illustrates an embodiment of a determination of the amount of available power when a transponder is in a given coupling relation with a terminal. In the example of FIG. 5, this determination is assumed to respond to a request REQ sent by the terminal. To simplify the discussion of the following drawings, it is still referred to the values of voltages $V_{C2}$, knowing that it is in practice easier to measure and to exploit the values of voltage $V_{Ca}$ but that this changes nothing to the result.

It is started (block 41, MES $Ic_{]R20}$, $V_{C2]R20}$) by measuring and storing the value of the consumed current $Ic_{]R20}$ and of voltage $V_{C2]R20}$ with value R20 of resistor R2. This measurement for example corresponds to a measurement of the current conditions, that is, resistance R20 corresponds to the transponder load when it receives request REQ from the terminal. Resistance value R20 needs to be, however, known since it will be subsequently used to evaluate the coupling. A solution to determine the resistance value R20 is to calculate the ratio between the value (fixed and known) of voltage Vcc provided by regulator 26 and measured current $Ic_{]R20}$. As a variation, value R20 corresponds to a predefined resistive load value on which the transponder is switched, as will be seen hereafter in relation with FIG. 8.

Then, (block 42, R20→R21), the value of resistive element R2 is modified towards a value, for example, greater.

Then (block 43, $V_{C2]R21}$), voltage $V_{C2}$ is measured with resistance value R21, which is stored.

The value of ratio $k/k_{opt]R20}$ is then calculated (block 44, CAL $k/k_{opt]R20}$). Actually, to estimate the maximum possible current, it is sufficient to calculate the square $(k/k_{opt]R20})^2$ of the ratio (a square root calculation is thus avoided). This calculation amounts to applying formula 16 based on values $V_{C2]R20}$, $V_{C2]R21}$, R20, and R21.

This ratio is used to evaluate (block 45, CAL $Ic_{max}$) the maximum value $Ic_{max}$ of the current that the transponder can consume in the current coupling relation. This calculation amounts to applying formula 18 to the obtained values. Optional quantity $\Delta V$ which forms a security margin, represents, for example, between 5 and 30% of the value of nominal value Vcc (on which the regulator is set). In practice, since the value Vcc used in the calculation corresponds to a value stored in microcontroller 27, this stored value can include margin $\Delta V$. Value $\Delta V$ is estimated, for example, based on the tolerances with which the regulator provides voltage Vcc. The tolerances with which the transponder power consumptions have been estimated for the different operations (requests) to be performed may also be taken into account.

In the example of FIG. 5, once the possible maximum power consumption (before the drop of the supply voltage) has been determined, it is verified whether the request from the terminal is executable. For this purpose, maximum current $Ic_{max}$ is compared (block 46, $Ic_{REQ} \leq Ic_{max}$) with the current $I_{REQ}$ required to execute the request.

The currents necessary for the execution of the different requests, operations or calculations needs to be known by the microcontroller. For example, a memory area of the microcontroller (or of another memory of the transponder) contains a table of correlation between the operations and their consumption. The stored values may, according to the applications, correspond to the requests that the transponder may receive, to the execution of certain functions (for example, execution of a ciphering algorithm) or to an even more elementary level of operation (for example, a writing into an EEPROM). However, the more elementary this level, the more calculations the microcontroller needs to perform (add the different power consumptions) to determine the current required for a given request.

The power consumption of the different tasks or functions may be estimated at the design of the transponder or be obtained in a training phase with any terminal.

If the coupling conditions are such that the request is executable (output Y of block 46), the microcontroller executes it (block 47, EXEC). It may provide a result (RESULT) transmitted to the terminal in retromodulation.

If the coupling conditions do not enable executing the request (output N of the block 46), the processing of this request is not started (block 48, STOP).

Other actions may be taken if the available current is not sufficient.

Figure 6:
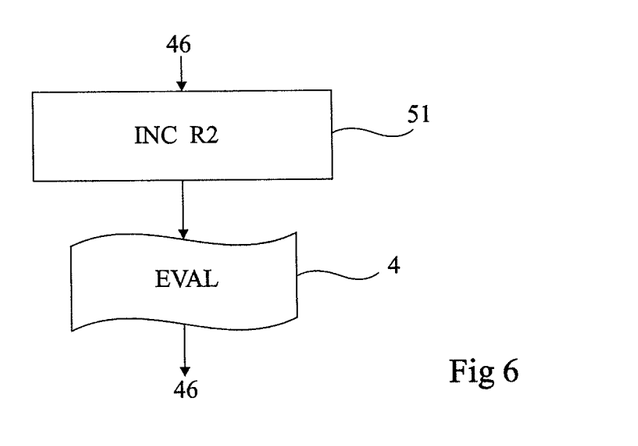
FIG. 6 is a functional block diagram illustrating a variation of the method of FIG. 5.

FIG. 6 partially illustrates a variation according to which the transponder searches a better operating condition in a given position.

For this purpose, the microcontroller causes an increase in the value of resistor R2 before the request is executed. This amounts to decreasing the load, and thus to increasing equivalent resistance R2 (block 51, INC R2). Then, it verifies that the current is sufficient with this new coupling condition by executing again the process of evaluation of current $Ic_{max}$ illustrated in FIG. 5 (block 4, EVAL). Such an adaptation may be performed once or several times.

The increase of resistance R2 may correspond to a resistor switching but, preferably, it is a decrease of the transponder consumption. For example, some ancillary functions may be set to stand-by or the execution of certain non-urgent operations may be postponed, or again the clock frequency may be slowed down.

Figure 7:
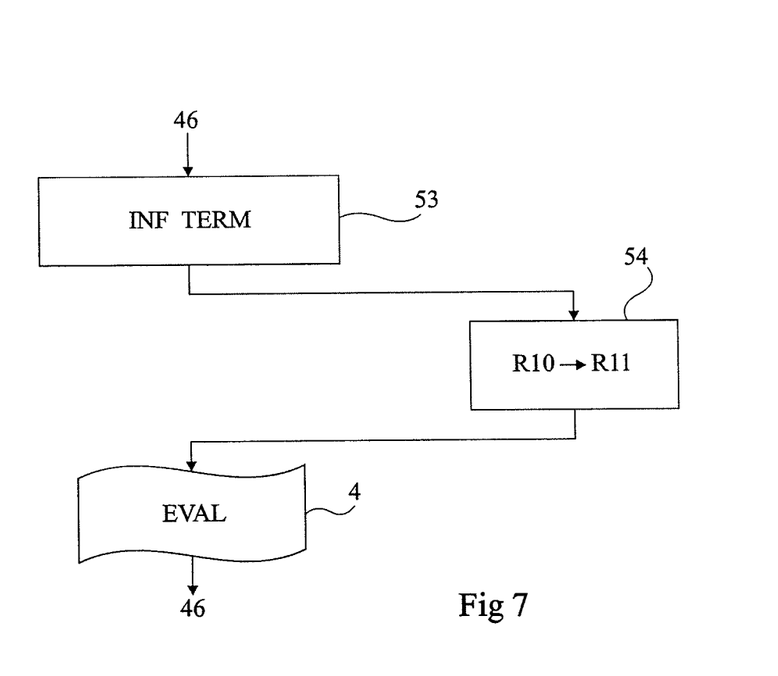
FIG. 7 is a functional block diagram of an embodiment illustrating another variation of the method of FIG. 5.

FIG. 7 partially illustrates another variation according to which the transponder communicates with the terminal so that said terminal adapts the power of the radiated field.

At the output of test 46, the transponder notifies the terminal that the power is insufficient for it to execute the request (block 53, INF TERM).

When it receives such information, the terminal attempts to adapt the power of the field without however detuning the oscillating circuits. To implement this embodiment, the terminal is capable of varying its series resistance R1. The terminal modifies (block 54, R10→R11) the value of its series resistance R1 from a nominal R10 to a lower value R11. Thus, the load complement required to reach the consumption required by the transponder is compensated by the terminal. Indeed, decreasing the value of resistance R1 amounts to decreasing, by the same ratio, the value of resistance R2.

According to the example of FIG. 7, the transponder evaluates, before sending the information to the terminal, the adaptation that it would need to execute the request. To estimate the required value $R2_{REQ}$ of resistor R2, it is considered that voltage $V_{C2]R2REQ}$ for value $R2_{REQ}$ and current $I_{REQ}$ needs to remain the same as voltage $V_{C2]R2}$ (the current voltage is sufficient to obtain voltage Vcc). This enables to write the following ratio between values $R2_{REQ}$ and R20:

$$\frac{R10}{R11} = \frac{R20}{R2_{REQ}} = \frac{I_{REQ}}{Ic_{]R20}}. \qquad \text{(formula 19)}$$

Accordingly, the transponder may transmit ratio $I_{REQ}/Ic_{]R20}$ (or values $I_{REQ}$ and $Ic_{]R20}$) to the terminal, which enables the terminal to vary resistance R1 accordingly.

As a variation, the minimum value of voltage $V_{C2min}$ is input. This enables optimizing the power provided by the terminal to bare necessities. Formula 19 becomes:

$$\frac{R10}{R11} = \frac{R2min}{R2_{REQ}} = \frac{I_{REQ}}{Ic_{max}}. \qquad \text{(formula 20)}$$

It may be provided for part only of the requests or operations to be submitted to a verification (for example, cryptographic operations where, for reasons of protection of the manipulated secret quantities, it is not desirable for the operation to be interrupted).

As a variation, what has been described in relation with a request corresponds to the execution of one or several functions generated by a request received from a terminal, which may be assimilated to the dividing of an external request received from a terminal into requests internal to the transponder. In this case, for any "critical" internal request, that is, a request for which it is desired to make sure that it can execute entirely, the microcontroller verifies the maximum available current before its execution.

Figure 8:
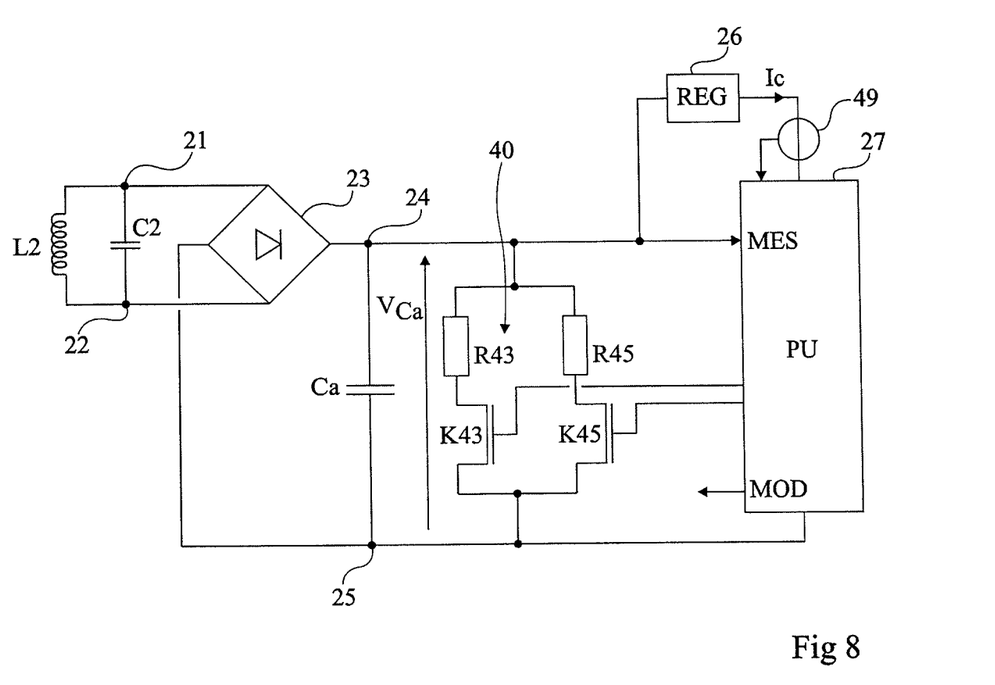
FIG. 8 is a block diagram of an embodiment of a transponder capable of evaluating the available power.

FIG. 8 is a block diagram of an embodiment of a transponder 2, equipped to manage the power according to the described method. The representation of FIG. 5 is simplified with respect to that of FIG. 2. In particular, the elements of demodulation, retromodulation, and for obtaining the clock frequency have not been illustrated.

As previously, transponder 2 is based on a parallel oscillating circuit L2-C2 having its terminals 21 and 22 connected to the input terminals of a rectifying bridge 23. An element for measuring current Ic intended for the processing unit is provided at the output of regulator 26. Further, a switchable resistive element 40 is provided between terminals 24 and 25 of rectifying bridge 23. For example, two resistors R43 and R45 are connected in parallel, each being in series with a switch K43, respectively K45. Switches K43 and K45 (for example, MOS transistors) are intended to be switched to implement the method for determining the coupling position. Processing unit 27 (PU) receives information about voltage $V_{Ca}$ on an input MES to implement the above-described method. Unit 27 also receives information relative to current Ic (for example, from a sensor 49). In the example of FIG. 8, when the two resistors R43 and R45 are functionally connected, resistor R2 (load of the transponder circuits) represents value R20. The disconnection of one of the resistors (for example, resistor R43) increases resistance R2 towards value R21. Other connections and switchings may be provided according to the variation of the implemented method. For example, a single switchable resistor may be used if it is considered, as described in relation with FIG. 5, that one of the two values of resistor R2 corresponds to the resistive load of the other transponder circuits.

According to a preferred embodiment, the switchable resistor corresponds to that used for a resistive retromodulation. For example, a first measurement is performed by switching the retromodulation resistor so that it is functionally in the circuit (switch K30 in the on state in the example of FIG. 2). Voltage $V_{C2]R20}$ is measured. Then, switch K30 is turned off and voltage $V_{C2]R21}$ is measured.

As a variation, the increase or the decrease of equivalent resistance R2 is caused by a variation in the power consumption of the transponder circuits, typically of processing unit 27. For example, to decrease the value of resistance R2 (increase the power consumption), the execution of calculations or of a processing by unit 27 is triggered. An increase in equivalent resistance R2 may also be caused by a decrease in the power consumption of unit 27 due to an interruption of certain calculations. As a variation, the execution speed conditioned by the clock is slowed down (block 20). The variation of resistance R2 is known from the time when the power consumption of the different tasks to be executed by unit 27 is known.

The calculations required to evaluate the available power are sufficiently simple for their execution time to be negligible with respect to the speed of the displacement of a transponder in front of a terminal (and thus the variation speed of the coupling coefficient). Such is, in particular, the case for transponders equipped with microcontrollers executing cryptography functions in which such calculation-intensive functions are themselves executed in a duration for which it can be considered that the coupling does not vary. In other cases, the transponder remains laid on a reception surface of the terminal and the coupling thus does not vary for a still longer period.

It should be noted that the evaluation of the available power is performed without it being necessary to establish a communication with the terminal.

Further, evaluating the current coupling against the optimum coupling such as described hereabove enables not to depend on the characteristics of a given terminal and makes the evaluation independent from the terminal. Thus, a transponder equipped with the coupling evaluation means of the present invention can operate with any existing terminal.

Various embodiments with different variations have been described hereabove. It should be noted that those skilled in the art can combine various elements of these various embodiments and variations without showing any inventive step. In particular, although in the above examples, reference has been made to an evaluation of the maximum available current, information relative to the available power can be directly exploited by involving in the different relations the minimum voltage ($V_{C2min}$) required for the transponder circuits.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method performed by an electromagnetic transponder in a magnetic field of a terminal, the method comprising steps of:
calculating a value of a current coupling between the transponder and the terminal;
measuring a value of a first electrical quantity of the transponder, wherein the first electrical quantity is selected from a group consisting of a current and a voltage;
using the value of the current coupling and the measured value of the first electrical quantity to deduce a value of a second electrical quantity extractable by the transponder from the magnetic field of the terminal;
determining whether to perform an operation based at least in part on the deduced value of the second electrical quantity; and
after it is determined to perform the operation, starting performance of the operation.

2. The method of claim 1, wherein the transponder comprises an oscillating circuit upstream of rectifying means capable of providing a D.C. voltage, and wherein calculating the value of the current coupling comprises:
measuring and storing first data relative to a first level of said D.C. voltage for a first value of a resistive load formed by circuits of the transponder on the oscillating circuit;
measuring and storing second data relative to a second level of said D.C. voltage for a second value of the resistive load; and
deducing, based at least in part on the first and second data, a position of the current coupling with respect to an optimum coupling position, wherein the optimum coupling position corresponds to a value of the resistive load selected from a group consisting of the first value of the resistive load and the second value of the resistive load.

3. The method of claim 1, wherein the deduced value of the second electrical quantity extractable by the transponder from the magnetic field of the terminal is a maximum value of the second electrical quantity extractable by the transponder from the magnetic field of the terminal.

4. The method of claim 2, further comprising switching a resistive retromodulation element of the transponder to vary the resistive load between the first and second values of the resistive load.

5. The method of claim 1, wherein determining whether to perform the operation comprises: determining whether the deduced value of the second electrical quantity is sufficient for the transponder to perform the operation.

6. The method of claim 5, wherein the second electrical quantity comprises a power extractable by the transponder from the magnetic field of the terminal, and wherein determining whether the deduced value of the second electrical quantity is sufficient for the transponder to perform the operation comprises:
loading, from a memory storing a plurality of amounts of power corresponding to a respective plurality of transponder operations, an amount of power corresponding to the operation; and
comparing the deduced value of the power extractable by the transponder from the magnetic field of the terminal to the amount of power corresponding to the operation.

7. The method of claim 1, further comprising:
determining whether the deduced value of the second electrical quantity is sufficient for the transponder to perform a particular operation; and
when it is determined that the deduced value of the second electrical quantity is not sufficient for the transponder to perform the particular operation, facilitating performance of the particular operation by adapting a device selected from the group consisting of the terminal and the transponder.

8. The method of claim 7, wherein facilitating performance of the operation by adapting the device selected from the group consisting of the terminal and the transponder comprises adapting the transponder by performing a second operation selected from the group consisting of: changing a clock frequency of a component of a load circuit of the transponder, placing at least a portion of the transponder in a stand-by mode, and postponing execution of a third operation of the transponder.

9. An electromagnetic transponder comprising:
an oscillating circuit upstream of a rectifying circuit capable of providing a D.C. voltage when the transponder is present in the magnetic field of a terminal; and
at least one processing unit capable of implementing the method of claim 1.

10. The transponder of claim 9, further comprising at least one switchable resistive element capable of being functionally connected in parallel on the oscillating circuit.

11. A transponder comprising:
an oscillator configured to provide a signal in response to a magnetic field of a terminal;
a voltage conversion circuit configured to convert the signal provided by the oscillator to a D.C. signal; and
a load circuit configured to form a resistive load on the oscillator,
wherein a resistance of the resistive load is variable,
wherein the load circuit comprises at least one processing unit configured to use a value of a coupling between the transponder and the terminal, and a measured value of a first electrical quantity of the transponder, to deduce a value of a second electrical quantity extractable by the transponder from the magnetic field of the terminal,
wherein the first electrical quantity is selected from a group consisting of a current and a voltage, and
wherein the at least one processing unit is further configured to determine whether to perform an operation based at least in part on the deduced value of the second electrical quantity; and, after it is determined to perform the operation, to start performance of the operation.

12. The method of claim 11, wherein the at least one processing unit is further configured to determine whether to perform the operation by determining whether the deduced value of the second electrical quantity is sufficient for the transponder to perform the operation.

13. The transponder of claim 12, wherein the second electrical quantity includes a power extractable by the transponder from the magnetic field of the terminal, and wherein the at least one processing unit is further configured to determine whether the deduced value of the second electrical quantity is sufficient for the transponder to perform the operation by:
loading, from a memory storing a plurality of amounts of power corresponding to a respective plurality of transponder operations, an amount of power corresponding to the operation; and
comparing the deduced value of the power extractable by the transponder from the magnetic field of the terminal to the amount of power corresponding to the operation.

14. The transponder of claim 11, wherein the at least one processing unit is further configured to:
determine whether the deduced value of the second electrical quantity is sufficient for the transponder to perform a particular operation; and
when it is determined that the deduced value of the second electrical quantity is not sufficient for the transponder to perform the particular operation, to facilitate performance of the particular operation by adapting a device selected from the group consisting of the terminal and the transponder.

15. The transponder of claim 14, wherein adapting the device selected from the group consisting of the terminal and the transponder comprises adapting the transponder by performing a second operation selected from the group consisting of: changing a clock frequency of the at least one processing unit, placing at least a portion of the transponder in a stand-by mode, and postponing execution of a third operation of the transponder.

16. The transponder of claim 14, wherein adapting the device selected from the group consisting of the terminal and the transponder comprises adapting the terminal by transmitting, to the terminal, a request for the terminal to increase the power of the magnetic field.

17. An electronic system comprising:
a transponder; and
a terminal,
wherein the transponder includes an oscillator configured to provide a signal in response to a magnetic field of the terminal, a voltage conversion circuit configured to convert the signal provided by the oscillator to a D.C. signal, and a load circuit configured to form a resistive load on the oscillator,
wherein the terminal includes an antenna and a regulating circuit configured to regulate a phase of a signal of the antenna such that a phase relationship between the antenna signal and a reference signal is constant,
wherein a resistance of the resistive load is variable,
wherein the load circuit comprises at least one processing unit configured to use a value of a coupling between the transponder and the terminal, and a measured value of a first electrical quantity of the transponder, to deduce a value of a second electrical quantity extractable by the transponder from the magnetic field of the terminal, and
wherein the first electrical quantity is selected from a group consisting of a current and a voltage.

18. The electronic system of claim 17, wherein the at least one processing unit is further configured:
to determine whether the deduced value of the second electrical quantity is sufficient for the transponder to perform a particular operation; and
when it is determined that the deduced value of the second electrical quantity is not sufficient for the transponder to perform the particular operation, to facilitate performance of the particular operation by adapting a device selected from the group consisting of the terminal and the transponder.

19. The system of claim 18, wherein adapting the device selected from the group consisting of the terminal and the transponder comprises adapting the transponder by performing a second operation selected from the group consisting of: changing a clock frequency of the at least one processing unit, placing at least a portion of the transponder in a stand-by mode, and postponing execution of a third operation of the transponder.

20. The system of claim 18, wherein adapting the device selected from the group consisting of the terminal and the transponder comprises adapting the terminal by transmitting, to the terminal, a request for the terminal to increase the power of the magnetic field.

21. A method performed by a transponder in a magnetic field of a terminal, the method comprising:
obtaining a value of a first electrical quantity of the transponder, wherein the first electrical quantity is selected from a group consisting of a current and a voltage;
using a value of a coupling between the transponder and the terminal, and the measured value of the first electrical quantity, to deduce a value of a second electrical quantity extractable by the transponder from the magnetic field of the terminal;

determining whether the deduced value of the second electrical quantity is sufficient for the transponder to perform a particular operation; and when it is determined that the deduced value of the second electrical quantity is not sufficient for the transponder to perform the particular operation, facilitating performance of the particular operation by adapting a device selected from the group consisting of the terminal and the transponder.

22. The method of claim 21, further comprising starting performance of the particular operation when it is determined that the deduced value of the second electrical quantity is sufficient for the transponder to perform the particular operation.

23. The method of claim 21, wherein the second electrical quantity extractable by the transponder from the magnetic field of the terminal includes a power extractable by the transponder from the magnetic field of the terminal, and wherein determining whether the deduced value of the second electrical quantity is sufficient for the transponder to perform the particular operation comprises:

loading, from a memory storing a plurality of amounts of power corresponding to a respective plurality of transponder operations, an amount of power corresponding to the particular operation; and comparing the deduced value of the power extractable by the transponder from the magnetic field of the terminal to the amount of power corresponding to the particular operation.

24. The method of claim 21, wherein adapting the device selected from the group consisting of the terminal and the transponder comprises adapting the transponder by changing a clock frequency of a component of a load circuit of the transponder.

25. The method of claim 21, wherein adapting the device selected from the group consisting of the terminal and the transponder comprises adapting the transponder by placing at least a portion of the transponder in a stand-by mode.

26. The method of claim 21, wherein adapting the device selected from the group consisting of the terminal and the transponder comprises adapting the transponder by postponing execution of a second operation of the transponder.

27. The method of claim 21, wherein adapting the device selected from the group consisting of the terminal and the transponder comprises adapting the terminal by transmitting, to the terminal, a request for the terminal to increase the power of the magnetic field.

28. The method of claim 21, further comprising determining the value of the coupling between the transponder and the terminal.

29. The method of claim 28, wherein determining the value of the coupling between the transponder and the terminal comprises:

obtaining data representative of first and second levels of a voltage across an oscillating circuit of the transponder for respective first and second values of a resistive load of the transponder; and determining, based at least in part on the data representative of the first and second levels of the voltage, the value of the coupling.

30. The method of claim 21, wherein the second electrical quantity extractable by the transponder from the magnetic field is an amount of current extractable by the transponder from the magnetic field.

31. The method of claim 21, wherein the second electrical quantity extractable by the transponder from the magnetic field is an amount of power extractable by the transponder from the magnetic field.

32. The method of claim 21, further comprising, after facilitating performance of the particular operation by adapting the device selected from the group consisting of the terminal and the transponder:

deducing a second value of the second electrical quantity; and determining whether the second value of the second electrical quantity is sufficient for the transponder to perform the particular operation.

33. The method of claim 1, wherein the second electrical quantity is selected from a group consisting of a current and a power.

34. The method of claim 1, wherein the first and second electrical quantities are a load current of the transponder.

35. The method of claim 7, wherein facilitating performance of the operation by adapting the device selected from the group consisting of the terminal and the transponder comprises: adapting the terminal by transmitting, to the terminal, a request for the terminal to increase the power of the magnetic field.

* * * * *